United States Patent [19]

Brandenstein et al.

[11] Patent Number: 4,569,429
[45] Date of Patent: Feb. 11, 1986

[54] COUPLING RELEASE, PARTICULARLY FOR PULLING ACTION COUPLINGS

[75] Inventors: Manfred Brandenstein, Eusenheim; Horst M. Ernst, Eltingshausen; Lothar Walter; Wolfgang Friedrich, both of Schweinfurt, all of Fed. Rep. of Germany

[73] Assignee: SKF Kugellagerfabriken GmbH, Schweinfurt, Fed. Rep. of Germany

[21] Appl. No.: 313,822

[22] Filed: Oct. 22, 1981

[30] Foreign Application Priority Data

Oct. 24, 1980 [DE] Fed. Rep. of Germany ... 8028328[U]

[51] Int. Cl.$^4$ ............................................. F16D 23/14
[52] U.S. Cl. ................................................... 192/98
[58] Field of Search ............... 403/338, 335, 336, 410, 403/311, 313; 285/364, 406; 220/5 R; 114/22; 192/98, 110 R, 110 B, 89 B

[56] References Cited

U.S. PATENT DOCUMENTS

| 184,599 | 11/1876 | Ehrhardt | 285/364 X |
|---|---|---|---|
| 1,185,049 | 5/1916 | Best | 285/364 X |
| 1,949,055 | 2/1934 | Lambie | 285/364 X |
| 2,126,505 | 8/1938 | Risser | 285/364 X |
| 2,815,231 | 12/1951 | Wilson | 403/335 X |
| 3,165,341 | 1/1965 | Burns et al. | 403/338 X |
| 3,921,775 | 11/1975 | Matyschik | 192/98 |
| 3,940,008 | 2/1976 | Flanders | 285/364 X |
| 4,037,863 | 7/1977 | Kunzle | 403/338 X |
| 4,125,181 | 11/1978 | Stenzinger | 192/98 |

FOREIGN PATENT DOCUMENTS

| 1072026 | 12/1959 | Fed. Rep. of Germany | 285/364 |
|---|---|---|---|
| 2221231 | 11/1973 | Fed. Rep. of Germany | 192/98 |
| 2811195 | 10/1978 | Fed. Rep. of Germany | . |
| 2833815 | 2/1980 | Fed. Rep. of Germany | 403/338 |
| 2389791 | 1/1979 | France | 403/338 |

Primary Examiner—George H. Krizmanich
Attorney, Agent, or Firm—Eugene E. Renz, Jr.

[57] ABSTRACT

Coupling release assembly comprising a sliding sleeve and a coupling bearing having a fixed bearing ring connected with a radially oriented flange of the sliding sleeve and a rotating bearing ring having a contact surface for a coupling lever, a socket of generally U-shaped cross section consisting of two half moon-shaped shells secured to the outer periphery of a flange of the sliding sleeve and the fixed bearing ring and biasing member urging the fixed bearing ring and flange of the sliding sleeve in prestressed contact with the opposing radially inwardly directly sides of the socket member.

2 Claims, 2 Drawing Figures

COUPLING RELEASE, PARTICULARLY FOR PULLING ACTION COUPLINGS

BACKGROUND AND SUMMARY OF THE INVENTION

The present invention relates to a coupling release assembly comprising a sliding sleeve and a coupling bearing wherein the fixed bearing ring is connected to a radially directed flange of the sliding sleeve and the rotating bearing ring has a contact surface for the coupling lever.

Coupling release assemblies are not new per se. In accordance with one prior known arrangement shown in German Patent DE-OS No. 2,811,195, the coupling bearing is connected with the sliding sleeve by means of an L-shaped elastic ring disposed on the radially outwardly oriented edge of the pressure plate and encompassing a flange on the fixed bearing ring. This assembly has certain disadvantages and drawbacks. For example, this arrangement is somewhat difficult to assemble by reason of the fact that the elastic ring must be deformed when snapped onto the corresponding parts of the coupling bearing and the sliding sleeve.

With the foregoing in mind, an object of the present invention is to provide an improved coupling release assembly of the above mentioned type which is characterized by novel features of construction and arrangement wherein a simple and secure connection of the coupling bearing with the sliding sleeve is achieved. To this end a socket is mounted on the mantle surfaces of the flanges of the sliding sleeve. The socket is of generally U-shaped cross section and is divided in an axial direction into a pair of half shells which are connected in a radial direction with the sliding sleeve or the bearing ring and wherein the radially inwardly directed sides are arranged to contact with a predetermined prestress the surfaces of the exterior ring and/or the sliding sleeve. By this arrangement, there is provided a simple connection of the sliding sleeve with the coupling bearing which can be accomplished with comparatively few manipulations. Further, this type of connection allows a certain amount of radial play of the coupling bearing so that it can adjust itself in a precise central position in relation to the tongue ends of the coupling membrane spring.

DESCRIPTION OF THE DRAWINGS

These and other objects of the present invention and the various details of the operation and construction thereof are hereinafter more fully set forth with reference to the accompanying drawing, wherein.

DESCRIPTION OF THE PREFERRED EMBODIMENT

Figure 1:
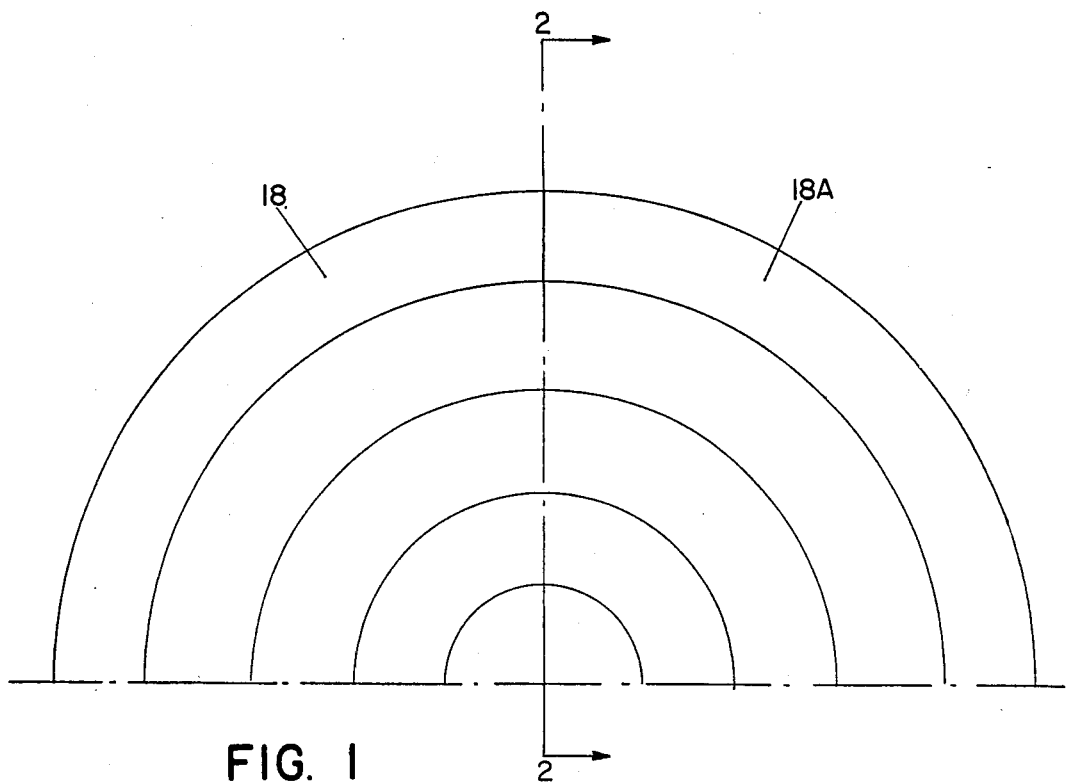
FIG. 1 is a front elevational view looking axially at a coupling release assembly in accordance with the present invention.
Figure 2:
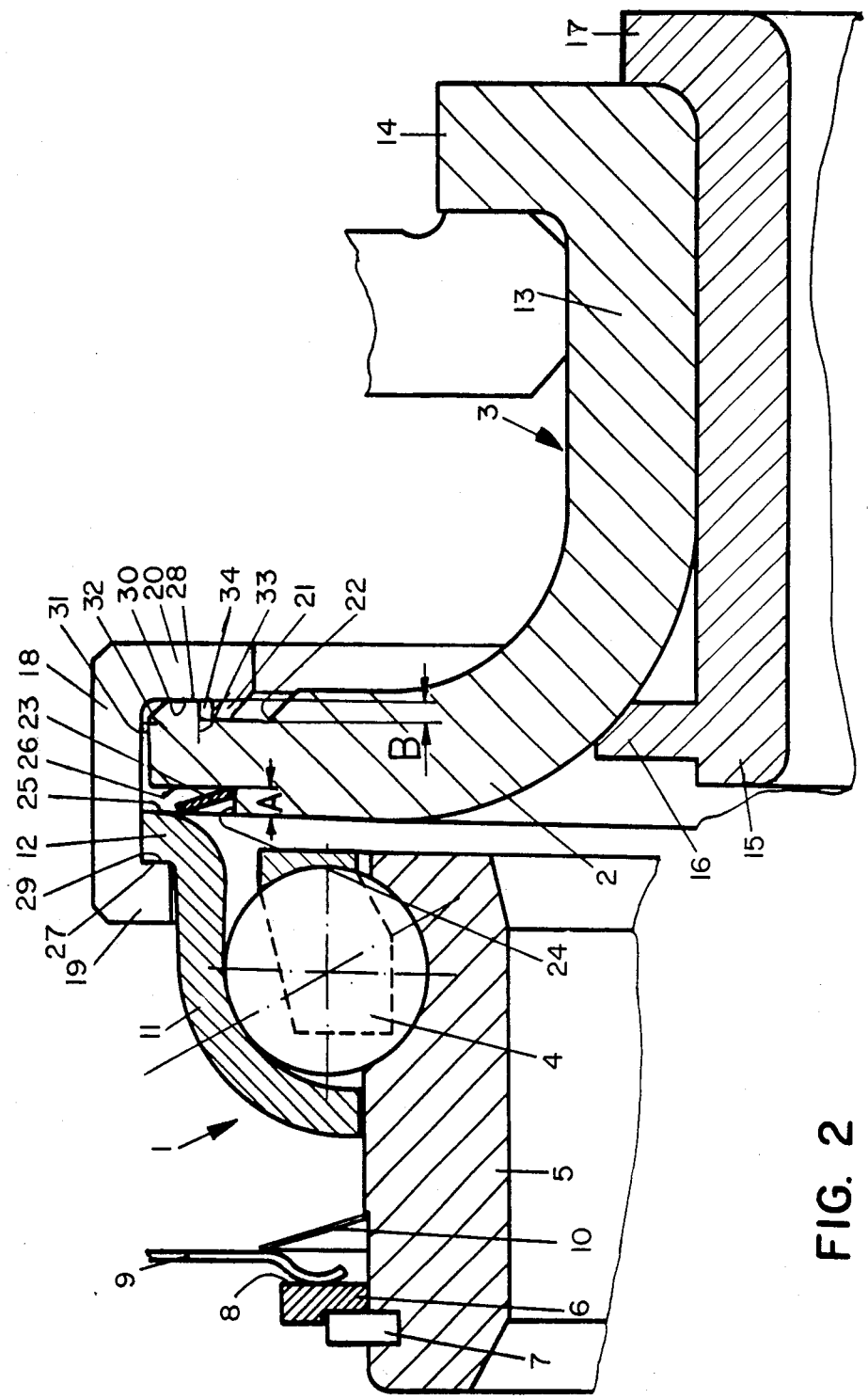
FIG. 2 is a fragmentary transverse sectional view taken along the line 2—2 of FIG. 1.

Referring now to the drawings, there is illustrated a coupling release assembly including a coupling bearing 1, which is arranged on a radially outwardly directed flange 2 of a sliding sleeve 3. As illustrated, the coupling bearing 1 has a massive rotating inner ring 5 having an arcuate raceway formed therein defining the inner race for rolling elements, in the present instance balls 4. The inner ring 5 projects outwardly from the inner raceway 5a and extends to the tongues 9 of a coupling membrane spring or coupling lever. An annular pressure flange 6 is mounted on the outer peripheral surface or mantle of the extended inner ring portion 5b, the pressure flange 6 being supported in an axial direction on a spring ring 7 engaging in a groove 5c in the extended inner ring portion 5b and defining a contact surface 8 engageable by the tongues 9 of the coupling membrane spring. The tongues 9 are pressed against the contact surface by means of a disc spring 10 so that the coupling release assembly is connected without play with the coupling (not shown). The outer ring 11 of the coupling bearing 1 is fixed and preferably made out of sheet metal and is of arcuate configuration including a radially outwardly directed edge 12. The sliding sleeve 3 as illustrated consists of a generally cylindrical sleeve section 13 having a radially outwardly directed flange 2 at one axial end thereof facing the coupling bearing 1 and at its opposite end also has an outwardly directed shorter flange or edge 14. The sliding sleeve 3 also includes a slide sleeve member 15 preferably made of a synthetic material which is disposed in the bore of the sleeve section 13 and fixed in an axial direction relative thereto by means of axially spaced molded edge members 16 and 17. The coupling bearing 1 is connected to the sliding sleeve 3 by means of a socket member also preferably made of a synthetic material which is of U-shaped cross section having radially inwardly directed sides and divided in an axial direction to form two semi-circular socket sections 18 and 18a. The short radially outwardly directed edge or peripheral flange 12 of the outer bearing ring 11 and the longer radially inwardly directed leg 20 snaps into an axially oriented circular groove 22 on the front face of the flange 2 by means of an axially inwardly directed projection 21 formed on the inner terminal end of the leg 20 of the socket members 18 and 18a.

When assembling the coupling release, a disc-like saucer spring 23 is mounted on a circumferentially extending ledge or shoulder 24 formed in the outer face of the flange 2 adjacent its outer terminal end, the spring 23 abutting the axial end surface 25 of the outer ring and the radial front face of the flange 2. Further, the semi-circular sections of the socket sections 18 and 18a are assembled in a radial direction on to the peripheral flange 12 of the outer ring 11 and the flange 2 of the sliding ring 3. By this arrangement, the sliding sleeve 3 is urged towards the coupling bearing 1 and the saucer spring 23 compressed. Further, when the circumferentially extending projection 21 snaps into the circular groove 22 of the flange 2, the spring 23 presses the outer ring 11 and the sliding sleeve 3 away from one another so that the front face 27 of the outer ring 11 and the outer surface 28 of the sliding sleeve 3 are urged against the surfaces 29 and 30 of the semi-circular sections 18 and 18a of the socket member leaving an open space having an axial distance A between the coupling bearing 1 and the flange 2 of the sliding sleeve. This axial distance A is greater than the axial dimension B of the projection 21. As a result the semi-circular socket sections 18 and 18a of the socket member can be readily attached or removed after compressing the spring 23. Further, a radial clearance is provided between the outer peripheral mantle surface 31 of the flange 2 and the bore surface 32 of the semi-circular socket sections 18 and 18a as well as between the axially extending surface 33 of the circular groove 22 and the axially oriented surface 34 of the circumferentially extending projection 21 so that the coupling bearing 1 can adjust itself concentrically to the tongue ends 9 of the coupling membrane spring.

While a particular embodiment of the present invention has been illustrated and described herein, it is not intended to limit the invention and changes and modifications may be made therein within the scope of the following claims.

For example, instead of the saucer spring 23, an elastic O-ring of synthetic material may be utilized which assures good sealing in this area and allows radial adjustment of the coupling bearing 1. Additionally, even though the socket member is described as being preferably made of a synthetic material, it may also be made of metal. In addition, the saucer spring 23 can also be placed between the outer ring and the semi-circular socket sections 18 and 18a or between the flange of the sliding sleeve 3 and the semi-circular socket sections 18 and 18a and in this instance the socket members have prestressed contact either with the flange of the sliding sleeve or with the outer ring. Lastly, in order to fix the semi-circular socket sections 18 and 18a in a radial direction by means of their shape, it is also possible to locate the axially oriented projection 21 on the outer ring 11 or on the sliding sleeve 3 and in this event the projection engages in a circumferentially extending groove and the semi-circular socket sections 18 and 18a.

What is claimed is:

1. A coupling release assembly, comprising:
   a sliding sleeve having a radially oriented flange, said flange having a peripheral mantle surface and an annular groove having an axially extending surface;
   a coupling bearing having a fixed bearing ring and a rotating bearing ring having a contact surface for a coupling lever;
   a socket member having a generally U-shaped cross section formed by radially inwardly directed sides and a bore surface, consisting of two semi-circular socket sections secured to and connecting the outer periphery of said radially oriented flange and said fixed bearing ring, said semi-circular socket sections each having an axially directed projection having an axially oriented surface;
   biasing means urging the fixed bearing ring and/or said radially oriented flange in prestressed contact with one or both of the radially inwardly directed sides of said socket member;
   means defining a radial clearance between said peripheral mantle surface of said radially oriented flange and said bore surface of said socket member; and
   means defining a radial clearance between said axially extending surface of said annular groove and said axially oriented surface of said projection.

2. A coupling release assembly comprising:
   a sliding sleeve having a radially oriented flange, said flange having a peripheral mantle surface, an outer side face, and an annular groove having an axially extending surface;
   a coupling bearing having a fixed bearing ring and a rotating bearing ring having a contact surface for a coupling lever;
   a socket member detachably connecting said radially oriented flange and said fixed bearing ring, said socket member having a U-shaped cross section formed by radially inwardly directed sides and a bore surface, and divided in an axial direction to form semi-circular socket sections, each socket section having an inwardly directed rib having an axially oriented surface, said rib being engageable in said annular groove;
   biasing means mounted in a recessed portion formed in said outer side face of said radially oriented flange and operable to urge said fixed bearing ring and said radially oriented flange in prestressed contact with said radially inwardly directed sides of said socket member, the axial distance of said recessed portion being greater than the axial depth of said annular groove to permit assembly and disassembly of said socket sections;
   means defining a radial clearance between said peripheral mantle surface of said radially oriented flange and said bore surface of said socket member; and
   means defining a radial clearance between said axially extending surface of said annular groove and said axially oriented surface of said projection.

* * * * *